United States Patent
Maeda

(10) Patent No.: US 11,200,757 B2
(45) Date of Patent: Dec. 14, 2021

(54) SYSTEMS AND METHODS FOR RANGE PREDICTION

(71) Applicant: Honda Motor Co., Ltd., Tokyo (JP)

(72) Inventor: Eri Izumi Maeda, Rancho Palos Verdes, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 199 days.

(21) Appl. No.: 16/542,465

(22) Filed: Aug. 16, 2019

(65) Prior Publication Data

US 2021/0049832 A1 Feb. 18, 2021

(51) Int. Cl.
*G07C 5/00* (2006.01)
*B60W 40/12* (2012.01)

(52) U.S. Cl.
CPC ............ *G07C 5/004* (2013.01); *B60W 40/12* (2013.01); *B60W 2510/244* (2013.01); *B60W 2555/20* (2020.02); *B60W 2556/10* (2020.02); *B60Y 2200/91* (2013.01)

(58) Field of Classification Search
CPC .................................................. G07C 5/004
See application file for complete search history.

(56) References Cited

U.S. PATENT DOCUMENTS

| | | | |
|---|---|---|---|
| 7,849,944 B2 * | 12/2010 | DeVault | B60K 6/445 180/65.29 |
| 8,346,420 B2 | 1/2013 | Tarnowsky et al. | |
| 8,755,994 B2 | 6/2014 | Gilman et al. | |
| 9,037,327 B2 | 5/2015 | Kim | |
| 9,139,095 B2 | 9/2015 | Kim | |
| 9,211,804 B2 * | 12/2015 | Preece | H02J 7/1446 |
| 9,221,355 B2 | 12/2015 | Kuhn et al. | |
| 9,476,719 B2 | 10/2016 | Meyer et al. | |

(Continued)

FOREIGN PATENT DOCUMENTS

| | | |
|---|---|---|
| CN | 107264326 | 10/2017 |
| DE | 102009048821 | 4/2011 |
| EP | 3069923 | 2/2018 |

OTHER PUBLICATIONS

Clara Marina Martinez, et al., Driving Style Recognitions for Intelligent Vehicle Control and Advanced Driver Assistance: A Survey, IEEE Transactions on Intelligent Transportation Systems, Mar. 2018, pp. 666-676, vol. 19, Issue 3.

*Primary Examiner* — Michael A Berns
(74) *Attorney, Agent, or Firm* — Rankin, Hill & Clark LLP

(57) ABSTRACT

The system for range predication includes a pattern module, a consumption module, and a prediction module. The pattern module identifies a travel pattern of trips of a vehicle and receives vehicle data for the time period from the computing device of the vehicle. The travel pattern includes a path that is repeatedly traveled between an origin and a destination during a time period. The vehicle data includes historical range estimates for the vehicle along the path. The consumption module calculates energy consumption of the vehicle during the time period based on the vehicle data and determines actual remaining range values based on the energy consumption of the vehicle. The prediction module generates predictive range estimates along the path based on the actual remaining range and provides the predictive range estimates for a current trip.

20 Claims, 6 Drawing Sheets

(56) References Cited

U.S. PATENT DOCUMENTS

| | | |
|---|---|---|
| 9,561,804 B2 | 2/2017 | Meyer et al. |
| 9,612,130 B2 | 4/2017 | Liu et al. |
| 9,682,627 B2 | 6/2017 | Suzuki et al. |
| 9,834,111 B2 | 12/2017 | Grewal et al. |
| 9,849,802 B2 | 12/2017 | Chow et al. |
| 9,884,615 B2 * | 2/2018 | Pandit .................. B60W 20/00 |
| 10,059,219 B2 | 8/2018 | Qiu et al. |
| 10,295,362 B2 * | 5/2019 | Choi ..................... B60L 50/60 |
| 10,328,814 B2 * | 6/2019 | Miller ..................... B60L 1/02 |
| 10,850,624 B2 * | 12/2020 | Oba ..................... B60W 10/08 |
| 2014/0074329 A1 | 3/2014 | Yang et al. |
| 2014/0214267 A1 | 7/2014 | Sellschopp |
| 2016/0052397 A1 | 2/2016 | Meyer et al. |
| 2017/0059332 A1 | 3/2017 | Choi |
| 2017/0282738 A1 | 10/2017 | Miller et al. |
| 2018/0066958 A1 | 3/2018 | Choi et al. |
| 2019/0001958 A1 | 1/2019 | Oba et al. |
| 2019/0283585 A1 * | 9/2019 | Koebler .................... B60L 3/12 |
| 2019/0283587 A1 * | 9/2019 | Koebler .................... G06F 7/00 |
| 2019/0283588 A1 * | 9/2019 | Koebler ........... G08G 1/096775 |
| 2019/0283589 A1 * | 9/2019 | Koebler .............. B60L 15/2045 |
| 2019/0283591 A1 * | 9/2019 | Koebler .................... B60T 7/18 |
| 2019/0283593 A1 * | 9/2019 | Koebler ................ B60W 10/06 |
| 2019/0283598 A1 * | 9/2019 | Koebler .................... B60T 7/22 |
| 2019/0283601 A1 * | 9/2019 | Koebler ................. B60K 35/00 |
| 2021/0012584 A1 * | 1/2021 | Saavedra Roman .. G07C 5/004 |
| 2021/0049832 A1 * | 2/2021 | Maeda .................. G07C 5/004 |

\* cited by examiner ns set forth herein, according to one aspect.
SYSTEMS AND METHODS FOR RANGE PREDICTION

BACKGROUND

As new technologies for propelling vehicles are developed, vehicle occupants become less able to discern how far a vehicle will be able to travel given evolving onboard power sources. As one example, a psychological barrier to electric vehicle ownership is range anxiety—the fear that a vehicle has insufficient range to reach the desired destination. To combat range anxiety, some vehicles offer estimates of the range possible by the vehicle with, for example, a gas gauge or a remaining range estimate. However, the estimates of the range can rise and fall inconsistently based on topography, grade, and weather conditions, among others, thereby exasperating the range anxiety.

BRIEF DESCRIPTION

According to one aspect, a system for range prediction is provided. The system for range predication includes a pattern module, a consumption module, and a prediction module. The pattern module identifies a travel pattern of trips of a vehicle and receives vehicle data for the time period from the computing device of the vehicle. The travel pattern includes a path that is repeatedly traveled between an origin and a destination during a time period. The vehicle data includes historical range estimates for the vehicle along the path. The consumption module calculates energy consumption of the vehicle during the time period based on the vehicle data and determines actual remaining range values based on the energy consumption of the vehicle. The prediction module generates predictive range estimates along the path based on the actual remaining range values and provides the predictive range estimates for a current trip.

According to another aspect, a method for range prediction is provided. The method includes identifying a travel pattern of trips of a vehicle. The travel pattern includes a path that is repeatedly traveled between an origin and a destination during a time period. The method also includes receiving vehicle data for the time period from the computing device. The method includes calculating energy consumption of the vehicle during the time period based on the vehicle data. The method further includes determining actual remaining range values based on the energy consumption of the vehicle. The method yet further includes generating predictive range estimates along the path based on the actual remaining range values and providing the predictive range estimates.

According to a further aspect, a non-transitory computer readable storage medium storing instructions that when executed by a computer, which includes a processor perform a method for range prediction. The method includes identifying a travel pattern of trips of a vehicle. The travel pattern includes a path that is repeatedly traveled between an origin and a destination during a time period. The method also includes receiving vehicle data for the time period from the computing device. The vehicle data includes historical range estimates for the vehicle along the path. The method includes calculating energy consumption of the vehicle during the time period based on the vehicle data. The method further includes determining actual remaining range values based on the energy consumption of the vehicle. The method yet further includes generating predictive range estimates along the path based on the actual remaining range values and providing the predictive range estimates when the path is next traveled.

DETAILED DESCRIPTION

Figure 1:
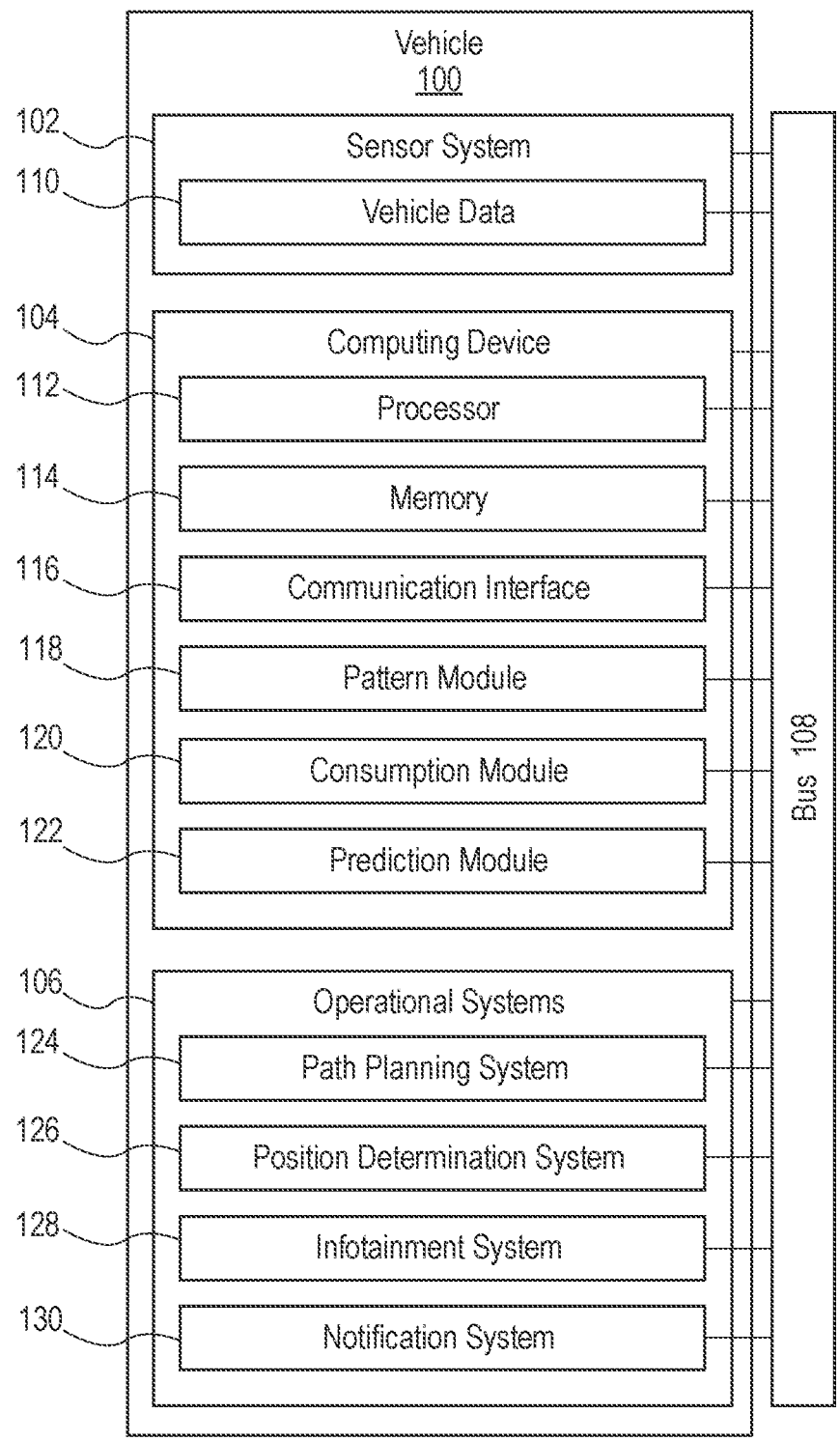
FIG. 1 is an exemplary component diagram of a system for range prediction, according to one aspect.

The range anxiety that vehicle occupants experience is a psychological barrier to adoption of new technologies, such as Batter Electric Vehicles. Even the provided estimate of remaining range may vary considerably based on topography, grade, and weather conditions, among others. For example, suppose that a vehicle is approaching a hill. When the vehicle is at the bottom of the hill, the vehicle may indicate that the vehicle has a remaining range of 80 miles. When the vehicle is ascending the hill, the vehicle may indicate that the remaining range is 45 miles because the vehicle is exerting additional force and therefore, losing considerable charge. However, when the vehicle is descending the hill, the remaining range may rise again because the vehicle is no longer exerting as much force. For example, the vehicle may indicate that the remaining range is 70 miles. These fluctuations in the estimate may make the vehicle occupant feel that the remaining range estimation is unreliable, thereby exasperating the vehicle occupant's range anxiety.

The systems and methods described herein reduce the range anxiety felt by the vehicle occupant by providing a more accurate range prediction. In particular, by recognizing travel patterns, a predictive range estimate can be generated based on previous trips. In this manner, previous trips can be leveraged for vehicle data that can be used to determine how the vehicle has used energy in the past. For example, the vehicle may generate predictive range estimate based on the vehicle's actual charge consumption on a previous trip. Therefore, the predictive range estimate is based on vehicle operation information, which reduces the dependency of range estimates on external factors (e.g., topography, grade, weather conditions, etc.). Accordingly, the estimation fluctuations caused by the external factors are reduced, thereby improving the reliability of the predictive range estimates, which may reduce range anxiety.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR- RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant).

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

I. Systems Overview

Referring now to the drawings, the drawings are for purposes of illustrating one or more exemplary embodiments and not for purposes of limiting the same. FIG. 1 is an exemplary component diagram of an operating environment of a vehicle 100 for range prediction. The operating environment includes a sensor system 102, a computing device 104, and operational systems 106 interconnected by a bus 108. The components of the operating environment, as well as the components of other systems, hardware architectures, and software architectures discussed herein, may be combined, omitted, or organized into different architectures for various embodiments.

The sensor system 102 provides and/or senses information associated with a device, such as the vehicle 100, and may include a number of sensors located on the interior of the vehicle 100 and/or the exterior of the vehicle 100. The computing device 104 may be implemented with a device, again such as the vehicle 100, or remotely stored. For example, with respect to a vehicle embodiment of FIG. 1, the computing device 104 may be implemented as part of a telematics unit, a head unit, a navigation unit, an infotainment unit, an electronic control unit, among others of a vehicle, such as the vehicle 100 shown. The computing device 104 may be capable of providing wired or wireless computer communications utilizing various protocols to send/receive electronic signals internally to/from components of the operating environment. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment.

The computing device 104 includes a processor 112, a memory 114, and a communication interface 116, which are each operably connected for computer communication via a bus 108 and/or other wired and wireless technologies. The communication interface 116 provides software and hardware to facilitate data input and output between the components of the computing device 104 and other components, networks, and data sources, which will be described herein. Additionally, the computing device 104 also includes a pattern module 118, a consumption module 120, and a prediction module 122 for range prediction facilitated by the components of the operating environment.

The computing device 104 is also operably connected for computer communication (e.g., via the bus 108 and/or the communication interface 116) to one or more operational systems 106. The operational systems 106 can include, but are not limited to, any automatic or manual systems that can be used to enhance the device, operation, and/or safety. The operational systems 106 may dependent on the implementation. For example, given a vehicular embodiment, the operational systems 106 include a path planning system 124, a position determination system 126, an infotainment system 128, and a notification system 130 according to an exemplary embodiment. The path planning system 124 monitors, analyses, operates the vehicle 100 to some degree. For example, the path planning system 124 may store, calculate, and provide directional information and facilitates features like vectoring and obstacle avoidance among others. The position determination system 126 can include hardware (e.g., sensors) and software to determine and/or acquire position data about the vehicle 100. For example, the position determination system 126 can include a global positioning system (GPS) unit (not shown) and/or an inertial measurement unit (IMU) (not shown). Thus, the position determination system 126 can provide a geo-position of the vehicle 100 based on satellite data from, for example, a global position source (not shown), or from any Global Navigational Satellite infrastructure (GNSS), including GPS, Glonass (Russian) and/or Galileo (European). Further, the position determination system 126 can provide dead-reckoning data or motion data from, for example, a gyroscope, accelerometer, magnetometers, among other vehicle sensors used by the sensor system 102. In some embodiments, the position determination system 126 can work with or be a component of the path planning system 124 that provides navigation maps and navigation information to the vehicle 100. The infotainment system 128 provides audio information, visual information, and/or entertainment to the vehicle occupant and can include a display (not shown). The notification system 130 identifies notifications, generates notifications, and facilitates communication.

The operational systems 106 also include and/or are operably connected for computer communication to the sensor system 102. The sensor system 102 provides and/or senses information associated with a device such as the vehicle 100, the portable device 400, and/or the operational systems 106. The sensor system 102 can include, but is not limited to, environmental sensors, vehicle speed sensors, accelerator pedal sensors, brake sensors, wheel sensors, among others. In some embodiments, the sensor system 102 is incorporated with the operational systems 106. For example, one or more sensors of the sensor system 102 may be incorporated with the position determination system 126 to monitor the location of the vehicle 100.

Accordingly, the sensor system 102 is operable to sense a measurement of data associated with the device, the device environment, and/or the operational systems 106 and generate a data signal indicating said measurement of data. These data signals can be converted into other data formats (e.g., numerical) and/or used by the sensor system 102, the computing device 104, and/or the operational systems 106 to generate other data metrics and parameters. It is understood that the sensors can be any type of sensor, for example, acoustic, electric, environmental, optical, imaging, light, pressure, force, thermal, temperature, proximity, among others. Using the system and network configuration discussed above, the remaining range of a vehicle can be more accurately predicted thereby giving a consumer and/or vehicle occupant peace of mind. Detailed embodiments describing exemplary methods using the system and network configuration discussed above will now be discussed in detail.

II. Methods Overview

Figure 2:
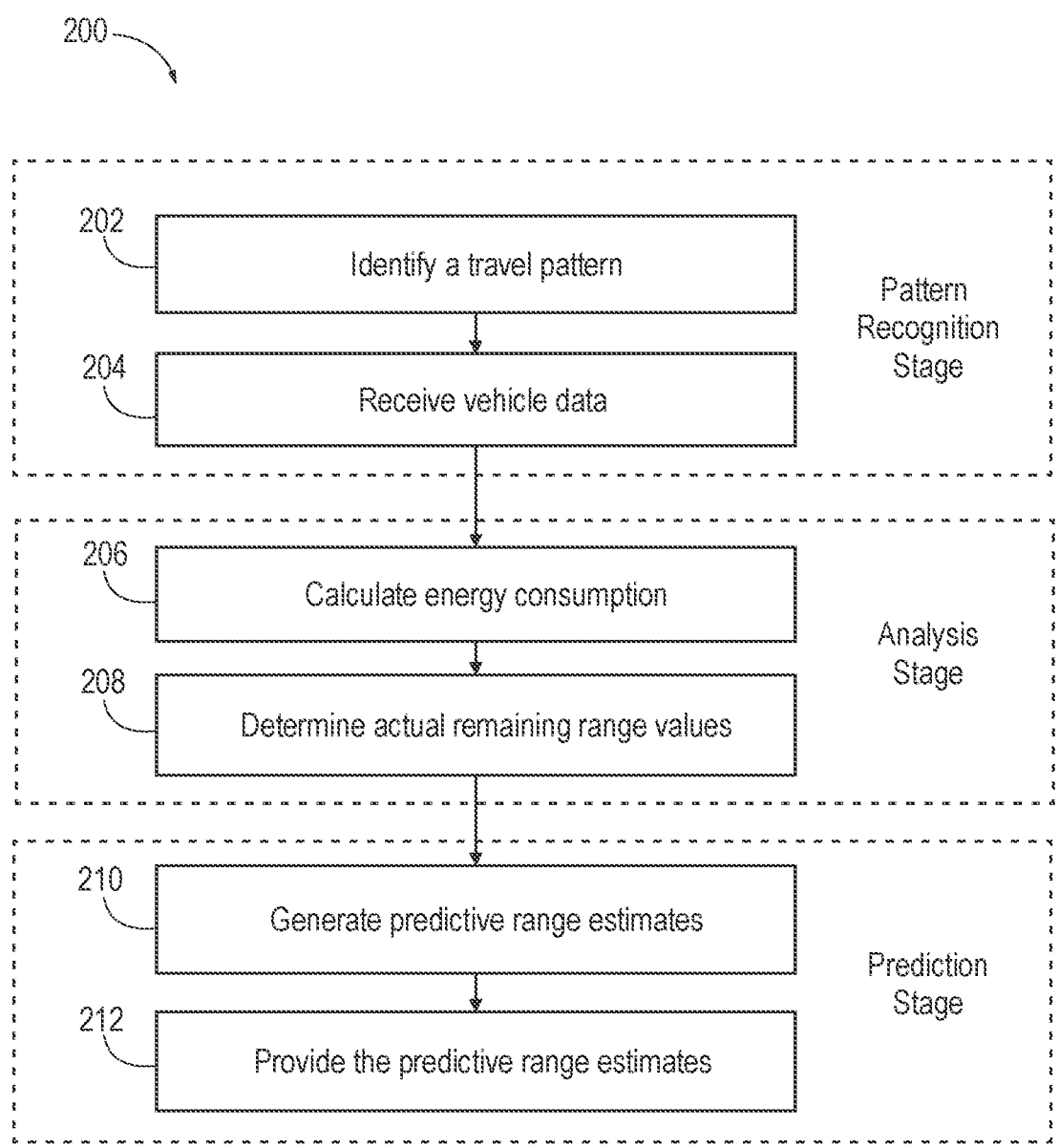
FIG. 2 is an exemplary process flow of a method for range prediction, according to one aspect.
Figure 3:
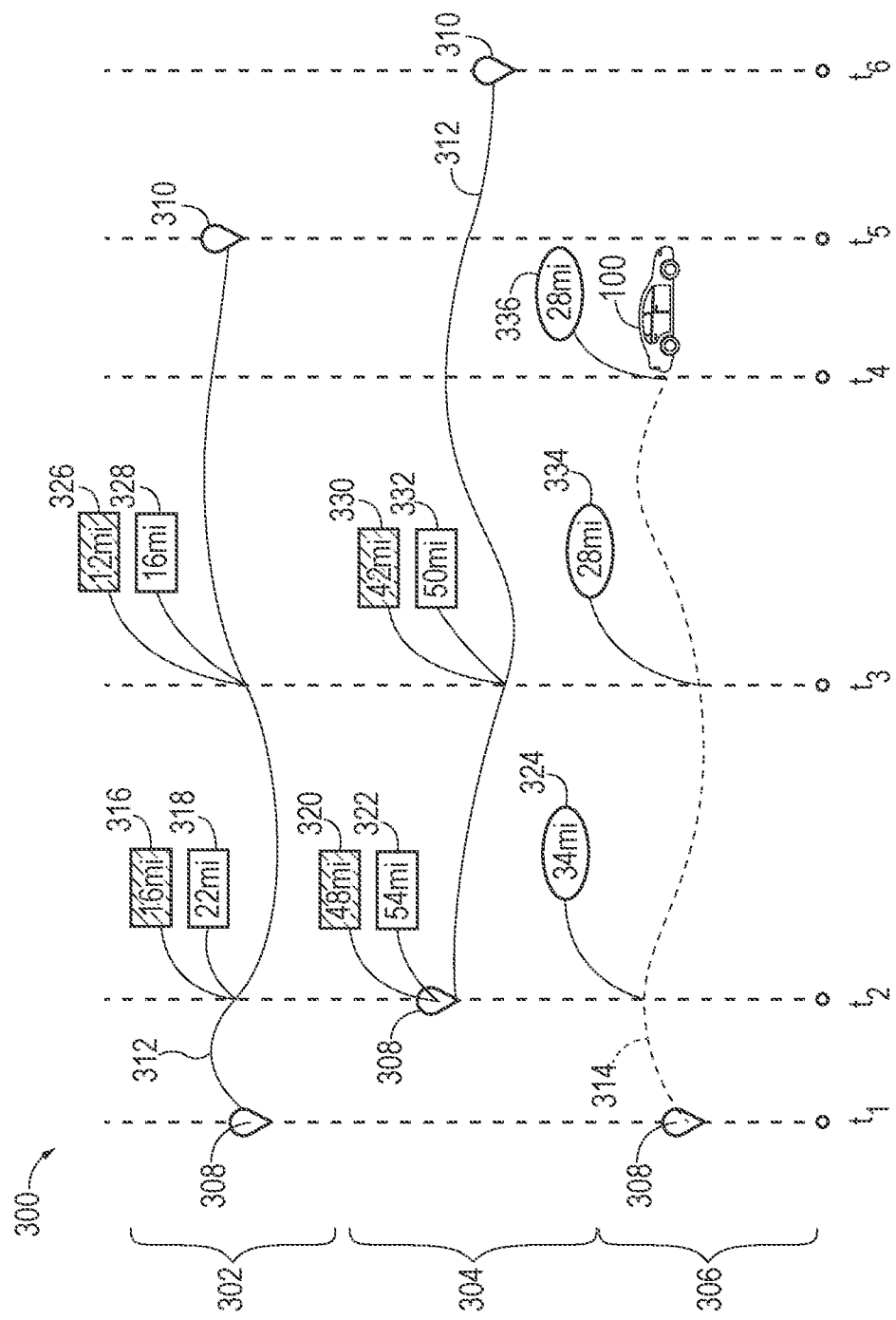
FIG. 3 is a schematic diagram of a vehicle engaged in a travel pattern used for range prediction, according to one aspect.
Figure 4:
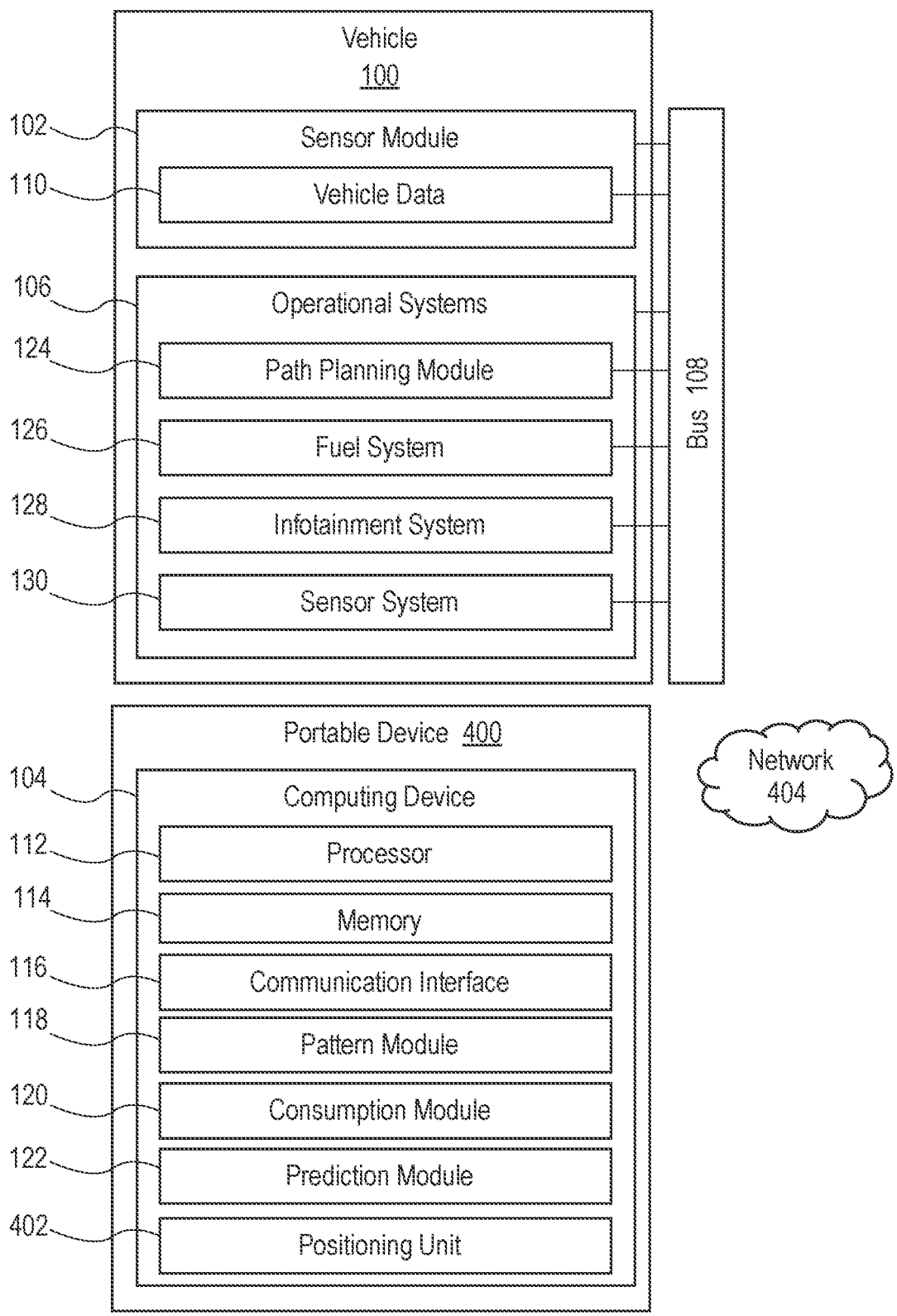
FIG. 4 is another exemplary component diagram of a system for range prediction having a portable device, according to one aspect.

Referring now to FIG. 2, a method 200 for range prediction will now be described according to an exemplary embodiment. FIG. 2 will also be described with reference to FIGS. 1, 3, and 4. The method 200 may also be implemented or facilitated by the implementation 500 of FIG. 5 or the system 600 of FIG. 6.

As shown in FIG. 2, the method for range prediction can be described by three stages, namely, (A) Pattern Recognition, (B) Analysis, and (C) Prediction. For simplicity, the method 200 will be described by these stages, but it is understood that the elements of the method 200 can be organized into different architectures, blocks, stages, and/or processes. For example, the reconstruction and prediction stages may be performed in parallel.

A. Pattern Recognition Stage

At block 202, the pattern module 118 identifies a travel pattern 300 of vehicle usage for the vehicle 100. For example, the travel pattern 300 includes a first trip 302 and a second trip 304 as well as a current trip 306 that the vehicle 100 repeatedly travels from an origin 308 to a destination 310 along a path 312 or a portion 314 of the path. Suppose the origin 308 of the travel pattern 300 is a residence and the destination 310 is a workplace. As the vehicle 100 commutes from the residence to the workplace, the vehicle 100 may be repeatedly driving the same path. Because the commute is a reoccurring trip including the origin 308 (e.g., residence), the destination 310 (e.g., workplace), and the path 312, the commute forms the travel pattern 300. Accordingly, the pattern module 118 may identify the commute as the travel pattern 300 based on the origin 308, the destination 310, the path 312, and/or a portion 314 of the path 312. The pattern module 118 may use discriminant analysis, classification, regression, parsing, and sequence labeling, among other to identify travel patterns in the travel of the vehicle 100. For example, the pattern module 118 may parse a trip log of the vehicle 100 to identify one or more travel patterns.

In addition to the origin 308, the destination 310, the path 312, and/or a portion 314 of the path 312, the pattern module 118 may identify the commute as a travel pattern 300 based on a time period. The time period is the duration of the trip. For example, the first trip 302 may have a start time, $t_1$ such that the vehicle 100 leaves the origin 308 at $t_1$, and the vehicle 100 may arrive at the destination 310 at an end time, $t_5$. Accordingly, the first trip 302 may have a time period equal to $t_5-t_1$. Suppose that $t_1$ is 7:50 AM and $t_5$ is 8:20 AM, then the time period is the 30 minutes. The time period may form a portion of the travel pattern 300. Suppose that the commute begins every morning, from Monday to Friday at 7:20 AM and lasts 30 minutes. Then, the travel pattern 300 may also be identified by the pattern module 118 using the start time and the time period.

However, continuing the example from above, the commute may not have the same start time, the same end time, or have the same time period but still be the generally repeated trip. For example, the pattern module 118 may identify a travel pattern 300 based on the time period occurring between a range of times, a predetermined time of day, and/or day of the week, month, year, etc. Suppose that for the second trip 304 along the path 312 from the origin 308 to the destination 310, the vehicle 100 leaves the origin 308 at $t_2$, for example 8:05 AM, reaches the destination 310 at $t_6$, for example 8:25 AM. For the second trip 304, the time period is given by $t_6-t_2$, or here, 20 minutes. Despite the difference in start time, end time, and time period, the second trip 304 may be generally considered to be a reoccurrence of the first trip 302. Accordingly, a trip from the origin 308 to the destination 310 considered a reoccurrence of the travel pattern 300 if traveled on a weekday, a weekday morning, and/or between 7:30 AM and 8:30 AM. Because the first trip 302 and the second trip 304 both start and end between 7:30 AM and 8:30 AM, the first trip 302 and the second trip 304 may be identified as trips of the travel pattern 300. In other embodiments, the range of time may require that a trip has a start time after a predetermined time, ends before the predetermined time, or other timing boundary, to be identified as a trip of the travel pattern 300.

In some embodiments, the pattern module 118 may identify a travel pattern 300 once a threshold number of occurrences of the trip occurs. For example, the pattern module 118 may identify a travel pattern 300 is identified when a trip along the path 312 is traveled ten times. The pattern module 118 may identify the travel pattern 300 based on ten trips of the vehicle 100 identified as reoccurrences, but if the reoccurrences only happen nine times, the threshold number of reoccurrences would not have been satisfied and the pattern module 118 would not identify the reoccurrences as the travel pattern 300. Moreover, a timing boundary may be related to the threshold number of occurrences. In one embodiment, the number of trips may have to occur within a predetermined amount of time. For example, the ten trips may have to occur within a one month period to satisfy the threshold number of reoccurrences.

At block 204, the pattern module 118 receives vehicle data 110 about the vehicle 100 during the trips of the travel pattern 300. For example, the pattern module 118, may receive vehicle data 110 from the sensor system 102, remote devices (e.g., via the bus 108 and/or the communication interface 116), and/or a portable device 400 (e.g., via the network 404) shown in FIG. 4. The vehicle data 110 may include a video sequence or a series of images, user inputs, and/or data from the operational systems 106, such as data from a Controller Area Network (CAN) bus including as pedal pressure, steer angle, etc. In some embodiments, the vehicle data 110 is augmented as additional sensor data from other sources is received. For example, the data from the CAN bus may be augmented by information about a vehicle occupant, a driving profile, and image/video data, among others.

The vehicle data 110 may include operational information about the vehicle 100 as the vehicle 100 traveled from the origin 308, to the destination 310, the path 312, and/or a portion 314 of the path 312. The vehicle data 110 may include information about on or more of the trips of the travel pattern 300 such as the first trip 302 and the second trip 304. For example, the vehicle data 110 may include time periods, amount of time during the trip that the vehicle 100 is moving, amount of time during the trip that the vehicle 100 is not moving, etc. The vehicle data 110 may also include distance of the trips, mileage of trip, amount of energy available, fuel efficiency of the trip, energy consumption of the trip, historical range estimates for the vehicle 100 along the path for the trips, and so on. For example, during the trips of the travel pattern 300, the vehicle 100 may have provided a vehicle occupant (not shown) with estimates of the remaining range of the vehicle 100.

The historical ranges estimates may be remaining range estimates for previous trips. For example, the pattern module 118 may estimate a first $t_2$ historical range estimate 316 for the first trip 302 to be that the vehicle 100 has a remaining range of 16 miles at $t_2$. Likewise, the pattern module 118 may estimate that a second $t_2$ historical range estimate 320 for the second trip 304 is that the vehicle 100 has a remaining range of 48 miles at $t_2$. The historical range estimates may vary from trip to trip based on the amount of available energy (e.g., fuel) when the vehicle 100 embarks from the origin 308. The historical range estimates may be continuously calculated as the vehicle 100 travels the path 312. In another embodiment, the historical range estimates may be calculated periodically. For example, at $t_3$, a first $t_3$ historical range estimate 326 for the first trip 302 may be estimated to be that the vehicle 100 has a remaining range of 12 miles. Likewise, a second $t_3$ historical range estimate 330 for the second trip 304 may be estimated to be that the vehicle 100 has a remaining range of 42 miles at $t_3$. In this manner, the pattern module 118 estimates at least one historical range for each trip of the travel pattern 300.

B. Analysis Stage

At block 206, the method 200 includes the consumption module 120 calculating energy consumption of the vehicle 100 during the time period based on the vehicle data 110. The energy consumption of the vehicle 100 is the actual amount of energy that was consumed by the vehicle 100 during the trip. The consumption module 120 may calculate the consumption based on the amount of energy consumed by the vehicle from one point in time to another. For example, the energy consumption for the first trip 302 at $t_2$ may be based on the amount of fuel consumed since the vehicle 100 left the origin 308 at $t_1$. In another embodiment, the consumption module 120 may calculate consumption based on the amount of energy available at a particular point in time. For example, the energy consumption for the second trip 304 at $t_2$ may be based on the charge level or the amount of fuel available to the vehicle 100 at the origin 308. Accordingly, the consumption module 120 may calculate the energy consumption of the vehicle 100 during trips of the travel pattern 300 based on the historic charge levels of the vehicle 100 on previous trips, such as the first trip 302 and the second trip 304.

At block 208, the method 200 includes the consumption module 120 determining actual remaining range values based on the energy consumption of the vehicle 100. For example, a first $t_2$ actual remaining range value 318 for the first trip 302 may be calculated based on the amount of energy consumed. Thus, the consumption module 120 may determine that the vehicle 100 had the first $t_2$ actual remaining range value 318 of 22 miles at $t_2$. Likewise, the consumption module 120 may determine that a second $t_2$ actual remaining range value 322 for the second trip 304 is 54 miles at $t_2$. The historical range estimates may vary from trip to trip based on the amount of available energy (e.g., fuel) when the vehicle 100 embarks from the origin 308 at $t_1$. Like the historical range estimates, the actual remaining range values may be continuously calculated as the vehicle 100 travels the path 312.

In another embodiment, the actual remaining range values may also be calculated periodically. For example, at $t_3$, a first $t_3$ actual remaining range value 328 for the first trip 302 may be that the vehicle 100 has a remaining range of 16 miles. Likewise, a second $t_3$ actual remaining range value 332 for the second trip 304 may be that the vehicle 100 has a remaining range of 50 miles at $t_3$. In this manner, the consumption module 120 determines at least one actual remaining range values for each trip of the travel pattern 300.

C. Prediction Stage

At block 210, the method 200 includes the prediction module 122 generating predictive range estimates along the path 312 based on the actual remaining range values. The predictive range estimates may also be based on the historical range estimates. For example, the first predictive range estimate 324 for the current trip 306 may be generated based on the first $t_2$ actual remaining range value 318 of 22 miles at $t_2$ and the second $t_2$ actual remaining range value 322 for the second trip 304 is 56 miles at $t_2$. Turning to the first trip 302, the first $t_2$ actual remaining range value 318 indicates that the vehicle 100 actually has a range 6 miles longer than estimated for the first $t_2$ historical range estimate 316. Likewise, for the second trip 304, the second $t_2$ actual remaining range value 322 indicates that the vehicle 100 actually has a range 6 miles longer than estimated for the second $t_2$ historical range estimate 320. Accordingly, suppose that at $t_2$ the vehicle has an energy a range estimate of 28 miles, the prediction module may generate the first predictive range estimate as 34 miles to compensate for the underestimate.

This example is simplified for clarity. However, other methods of generating a predictive range estimate along the path 312 may be used. For example, the prediction module 122 may be an artificial neural network that acts as a framework for machine learning, including deep learning. In particular, the prediction module 122 may be an autoencoder that determines the representations need to classify the vehicle data 110, energy consumption values, and/or the actual remaining range values such that the autoencoder operates in an unsupervised manner.

In one embodiment, the prediction module 122 may be a long short-term memory (LSTM) or other artificial recurrent neural network that can classify, process, and make predictions based on time series data, such that the prediction module 122 is not sensitive to gaps in timing between the trips of the travel pattern 300. The prediction module 122 may include convolutional layers and bi-directional LSTM layers. The convolutional layers capture inter-channel spatial correlations. The convolutional layers may include one dimensional (i.e., 1D) convolutional layers. The bi-directional LSTM layers capture inter-channel and intra-channel temporal correlations. As such, the vehicle data, the historical range estimates, and/or actual remaining range values may be used to identify inaccuracies in range estimates and generate predictive range estimates that reflect the actual fuel consumption based on the travel patterns of the vehicle 100.

In the example given above, the actual remaining range values indicate that the vehicle 100 actually has a range 6 miles longer than estimated for the historical range estimates at $t_2$. However, this deviation from the actual remaining range may not be constant for all times. Furthermore, the deviation from the actual remaining range may not constant for all trips in the travel pattern 300. For example, looking at t3, the first predictive range estimate 324 for the current trip 306 may be generated based on the first $t_3$ actual remaining range value 328 of 16 miles at $t_3$ and the second $t_3$ actual remaining range value 332 for the second trip 304 is 50 miles at $t_3$. Turning to the first trip 302, the first $t_3$ actual remaining range value 328 indicates that the vehicle 100 actually has a range that is 4 miles longer than estimated for the first $t_3$ historical range estimate 326. However, for the second trip 304, the second $t_3$ actual remaining range value 332 indicates that the vehicle 100 actually has a range that is 8 miles longer than estimated for the second $t_3$ historical range estimate 330.

Due to this dynamic difference between the first trip 302 and the second trip 304, the second predictive range estimate 334 may be an average based on the first $t_3$ actual remaining range value 328 and the second $t_3$ actual remaining range value 332. For example, the vehicle data 110 may include positioning information from the path planning system 124, the position determination system 126, and/or the positioning unit 402 to determine the location associated to determine the location of the vehicle 100 on the path 312 and/or a portion 314 of the path 312. The historical range estimates and/or the actual remaining range values can be associated with specific locations on the pathway. The historical range estimates and/or the actual remaining range values specific to the identified locations can be averaged so that a corresponding predictive range estimate can be generated for the identified locations. For example, given a specific location on the path 312, a predictive range estimate may be generated by averaging the actual remaining range values at that location. Returning to the example from above, suppose that the vehicle 100 is at the same location on the path 312 at $t_3$. As discussed above, the first $t_3$ actual remaining range value 328 indicates that the vehicle 100 actually has a range 4 miles longer than estimated for the first $t_3$ historical range estimate 326 for the first trip 302. The second $t_3$ actual remaining range value 332 indicates that the vehicle 100 actually has a range 8 miles longer than estimated for the second $t_3$ historical range estimate 330 for the second trip. By averaging the 4 mile increased range and the 8 mile increased range, the estimated range may be increased by 6 miles. Accordingly, when the vehicle 100 reaches the same location supposed from above to be $t_3$, an estimated range may be modified by increasing the estimated range by 6 miles. Thus, the prediction module 122 may generate a predictive range estimate by modifying a current range estimate for the vehicle 100 on the current trip 306.

Moreover, because the vehicle 100 may depart the origin 308 with various levels of charge, the prediction module 122 generates the predictive range estimates by comparing a historical charge level to a current charge level of the vehicle 100. For example, as discussed above, the first trip 302 and the second trip 304 show that the actual remaining range is increased by 6 miles at $t_2$. To generate the predictive range estimates, the prediction module 122 may determine the current charge level of the vehicle 100 on the current trip 306 to calculate the effect of the 6 mile increase. For example, if the current charge level of the vehicle 100 results in an estimated range of 28 miles, then the prediction module 122 may generate the first predictive range estimate 324 to be 34 miles. Accordingly, the prediction module 122 may use historical charge levels and current charge level to generate the predictive range estimates.

The prediction module 122 may use metrics calculated by the consumption module 120 to generate at least one predictive range estimate without relying on external factors. The prediction module 122 may also use other operational information of the vehicle data 110. For example, sensors of the sensor system 102 may detect information regarding driving style, congestion, based on time of day, season, weather, temperature, environmental systems (e.g., heater, air conditioning, fan, in-cabin lights, etc.), and driving conditions, among others to determine the predictive range estimates.

In another embodiment, the prediction module 122 may generate the predictive range estimates based on the type of energy used by the vehicle 100 or an alternative vehicle (not shown). Suppose that the vehicle 100 has a conventional combustion engine that operates using gasoline, but a consumer (not shown) is considering purchasing an electric vehicle that operates using a battery. The consumption module 120 may calculate energy consumption of the vehicle 100 based on the consumption of energy, here gasoline, and determines the actual remaining range values accordingly, in the manner described above. Therefore, the consumption module 120 may calculate based on the current technology of the vehicle 100. The prediction module 122, however, may generate the predictive range estimates based on the battery of an electric vehicle. In this manner, the consumption module 120 may calculate the consumption energy consumption based on a first energy technology of the vehicle 100, while the prediction module 122 generates the predictive range estimates based on a second energy technology.

Like the historical range estimates, the predictive range estimates may be continuously calculated as the vehicle 100 travels the path 312. In another embodiment, the predictive range estimates may also be calculated periodically. For example, the current trip 306 may include the first predictive range estimate 324 at $t_2$, the second predictive range estimate 334 at $t_3$, the third predictive range estimate 336 at $t_4$, and so on until the vehicle 100 reaches the destination 310.

At block 212, the method 200 includes the prediction module 122 providing the predictive range estimates. The predictive range estimates may be provided to a vehicle occupant through the vehicle 100. For example, the predictive range estimates may be displayed by the infotainment system 128. Additionally or alternatively, the notification system 130 may provide a notification such as audio cue or visual cue indicative of the remaining range. In another embodiment, the predictive range estimates may be provided to portable device 400, shown in FIG. 4. As discussed above, the systems and methods described herein may be performed, operated, or facilitated by the portable device 400. For example, the portable device 400 may include the pattern module 118, the consumption module 120, and the prediction module 122.

The portable device 400 may also include a positioning unit 402 that operates in a similar manner as the position determination system 126 described above. The sensor system 102 and the computing device 104 are also operatively connected for computer communication to the network 404. The network 404 is, for example, a data network, the Internet, a wide area network (WAN) or a local area network (LAN) network. The network 404 serves as a communication medium to various remote devices (e.g., databases, web servers, remote servers, application servers, intermediary servers, client machines, other portable devices).

Figure 5:
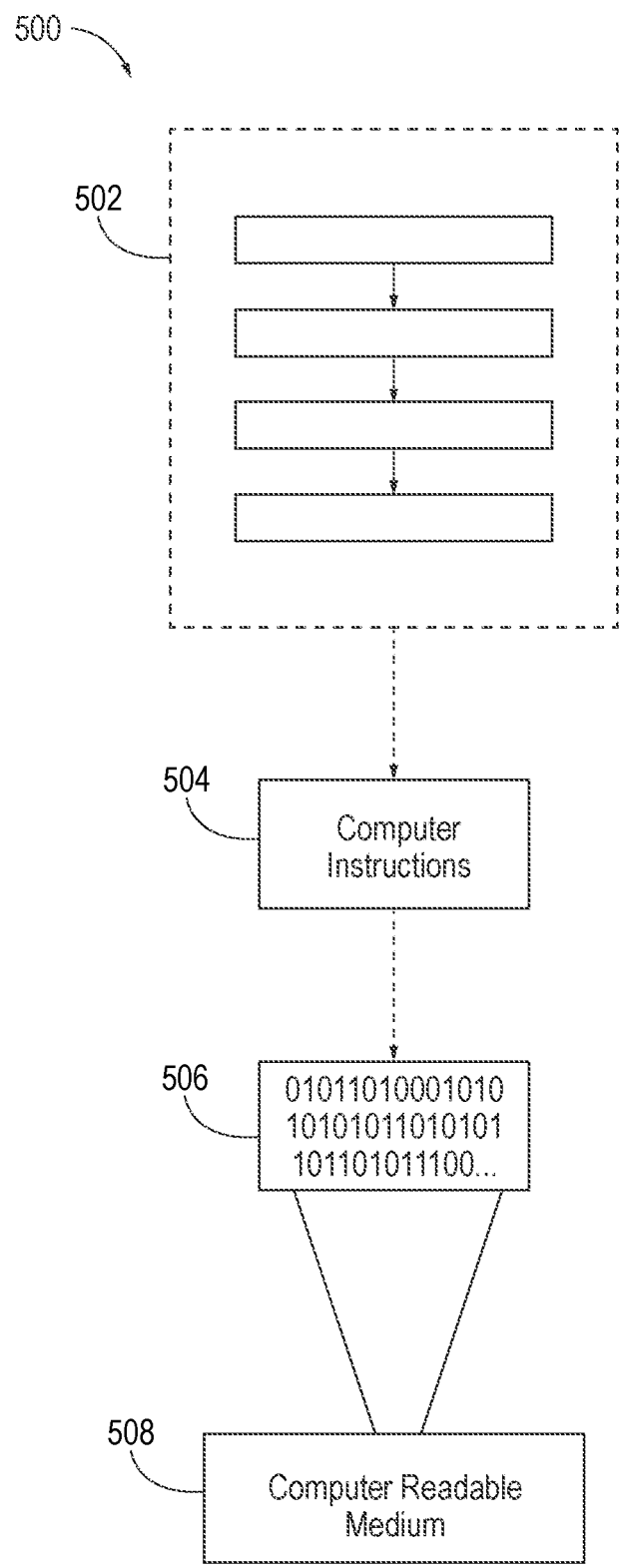
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 200 of FIG. 2. In another aspect, the processor-executable computer instructions 504 may be configured to implement a system, such as the operating environment of FIG. 1 and FIG. 4. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
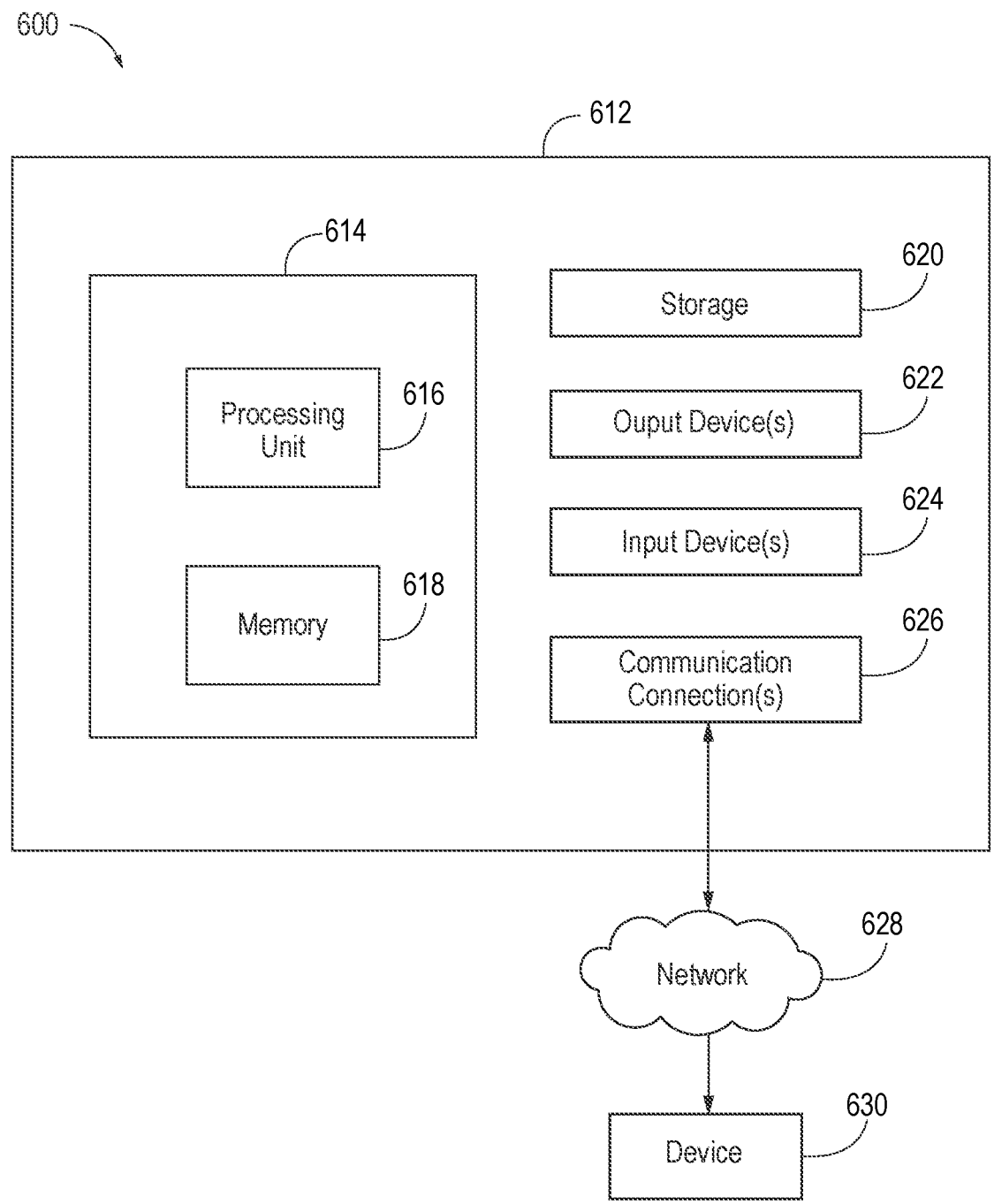
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including an apparatus 612 configured to implement one aspect provided herein. In one configuration, the apparatus 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the apparatus 612 includes additional features or functionality. For example, the apparatus 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 612. Any such computer storage media is part of the apparatus 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 612 includes input device(s) 624 such as keyboard, mouse, pen, voice input device, touch input device, infrared cameras, video input devices, or any other input device. Output device(s) 622 such as one or more displays, speakers, printers, or any other output device may be included with the apparatus 612. Input device(s) 624 and output device(s) 622 may be connected to the apparatus 612 via a wired connection, wireless connection, or any combination thereof. In one aspect, an input device or an output device from another computing device may be used as input device(s) 624 or output device(s) 622 for the apparatus 612. The apparatus 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for range prediction, comprising:
   a processor;
   a pattern module, implemented via the processor, configured to identify a travel pattern of trips of a vehicle and receives vehicle data for a time period between a start time and an end time from a computing device of the vehicle, wherein the travel pattern includes a path that is traveled at least a threshold number of reoccurrences between an origin and a destination during the time period that corresponds to a travel duration on the path, and wherein the vehicle data includes historical range estimates for the vehicle along the path;
   a consumption module, implemented via the processor, configured to calculate energy consumption of the vehicle during the time period based on the vehicle data and determines actual remaining range values based on the energy consumption of the vehicle;
   a prediction module, implemented via the processor, configured to generate predictive range estimates along the path based on the actual remaining range values and provides the predictive range estimates for a current trip, and
   a display of an infotainment system configured to display a notification including a visual cue indicative of a remaining range based on the predictive range estimates.

2. The system of claim 1, wherein the travel duration occurs during a range of hours at a predetermined time of day.

3. The system of claim 1, wherein the actual remaining range values are further based on a historical charge level of the vehicle.

4. The system of claim 1, wherein the prediction module, implemented via the processor, configured to compare a historical charge level to a current charge level of the vehicle at the origin.

5. The system of claim 1, wherein the energy consumption is based on a first energy technology of the vehicle, and wherein generating the predictive range estimates is based on a second energy technology.

6. The system of claim 1, wherein the threshold number of reoccurrences is satisfied when reoccurrences occur within a timing boundary.

7. A method for range prediction, comprising:
identifying a travel pattern of trips of a vehicle, wherein the travel pattern includes a path that is at least a threshold number of reoccurrences traveled between an origin and a destination during a time period between a start time and an end time, wherein the time period corresponds to a travel duration on the path;
calculating energy consumption of the vehicle during the time period based on vehicle data;
determining actual remaining range values based on the energy consumption of the vehicle;
generating predictive range estimates along the path based on the actual remaining range values; and
displaying the predictive range estimates as a notification including a visual cue on a display of an infotainment system.

8. The method of claim 7, wherein the travel duration occurs during a range of hours at a predetermined time of day.

9. The method of claim 7, further comprising receiving vehicle data for the time period, wherein the vehicle data includes historical range estimates for the vehicle along the path, and wherein determining the actual remaining range values are further based on a historical charge level of the vehicle.

10. The method of claim 9, wherein generating the predictive range estimates includes comparing the historical charge level to a current charge level of the vehicle at the origin.

11. The method of claim 7, wherein the energy consumption is based on a first energy technology of the vehicle, and wherein generating the predictive range estimates is based on a second energy technology.

12. The method of claim 11, wherein the vehicle data for the time period is received by a portable device, and wherein the predictive range estimates are provided to the portable device.

13. The method of claim 12, further comprising determining the portable device is traveling along the path based on positioning data calculated by the portable device, wherein the predictive range estimates are provided to the portable device in response to determining the portable device is traveling along the path.

14. The method of claim 11, wherein the threshold number of reoccurrences is satisfied when reoccurrences occur within a timing boundary.

15. A non-transitory computer readable storage medium storing instructions that when executed by a computer, which includes a processor to perform a method for range prediction, the method comprising:
identifying a travel pattern of trips of a vehicle, wherein the travel pattern includes a path that is traveled at least a threshold number of reoccurrences between an origin and a destination during a time period between a start time and an end time, wherein the time period corresponds to a travel duration on the path;
receiving vehicle data for the time period from the processor of the vehicle, wherein the vehicle data includes historical range estimates for the vehicle along the path;
calculating energy consumption of the vehicle during the time period based on the vehicle data;
determining actual remaining range values based on the energy consumption of the vehicle;
generating predictive range estimates along the path based on the actual remaining range values; and
displaying the predictive range estimates as a notification including a visual cue on a display of an infotainment system when the path is next traveled.

16. The non-transitory computer readable storage medium of claim 15, wherein the travel duration occurs during a range of hours at a predetermined time of day.

17. The non-transitory computer readable storage medium of claim 15, wherein determining the actual remaining range values further based on a historical charge level of the vehicle at the origin.

18. The non-transitory computer readable storage medium of claim 17, wherein generating the predictive range estimates includes comparing the historical charge level to a current charge level of the vehicle at the origin.

19. The non-transitory computer readable storage medium of claim 15, wherein the energy consumption is based on a first energy technology of the vehicle, and wherein generating the predictive range estimates is based on a second energy technology.

20. The non-transitory computer readable storage medium of claim 15, wherein the threshold number of reoccurrences is satisfied when reoccurrences occur within a timing boundary.

* * * * *